(12) United States Patent
Huffstetler et al.

(10) Patent No.: US 7,677,789 B2
(45) Date of Patent: Mar. 16, 2010

(54) MIXER ROTOR WITH SPIRAL CORE RIBS

(75) Inventors: Vernie D. Huffstetler, Murfreesboro, TN (US); Lakshman Santanam, Charlotte, NC (US); Mukulbhai N. Parikh, Charlotte, NC (US); James W. Page, Charlotte, NC (US)

(73) Assignee: Bridgestone Americas Tire Operations, LLC

( * ) Notice: Subject to any disclaimer, the term of this patent is extended or adjusted under 35 U.S.C. 154(b) by 943 days.

(21) Appl. No.: 11/454,510

(22) Filed: Jun. 16, 2006

(65) Prior Publication Data

US 2007/0291579 A1 Dec. 20, 2007

(51) Int. Cl.
B29B 7/82 (2006.01)
B29B 7/18 (2006.01)

(52) U.S. Cl. .................. 366/97; 366/147

(58) Field of Classification Search .......... 366/76.1, 366/76.7, 76.8, 76.9, 45–46, 76.93, 92, 97, 366/80, 59, 154.1, 185, 147, 228; 425/583
See application file for complete search history.

(56) References Cited

U.S. PATENT DOCUMENTS

| | | | | |
|---|---|---|---|---|
| 1,324,170 A * | 12/1919 | Pletscher et al. | ............... | 366/77 |
| 1,930,285 A | 10/1933 | Robinson | ..................... | 113/116 |
| 2,559,418 A | 7/1951 | Ford | | |
| 3,110,754 A | 11/1963 | Witort et al. | ................... | 174/70 |
| 3,403,894 A | 10/1968 | Matsuoka et al. | ........... | 259/104 |
| 3,795,121 A * | 3/1974 | Cressman | ................... | 366/228 |
| 3,972,529 A | 8/1976 | McNeil | ........................ | 273/80 |
| 4,284,358 A | 8/1981 | Sato et al. | ...................... | 366/97 |
| 4,300,838 A | 11/1981 | Sato et al. | ...................... | 366/84 |
| 4,395,132 A | 7/1983 | Wyffels | ........................ | 366/147 |
| 4,500,209 A * | 2/1985 | Steiner et al. | ............ | 366/157.2 |
| 4,506,983 A * | 3/1985 | Marr | .............................. | 366/44 |
| 4,714,350 A | 12/1987 | Nortey | ......................... | 366/84 |
| 4,730,934 A * | 3/1988 | Schwing | ........................ | 366/40 |
| 4,744,668 A | 5/1988 | Nortey | ......................... | 366/76 |
| 4,834,543 A | 5/1989 | Nortey | ......................... | 366/97 |
| 4,871,259 A | 10/1989 | Harada et al. | ................... | 366/85 |
| 5,000,426 A | 3/1991 | Campana et al. | .............. | 266/48 |
| 5,427,449 A * | 6/1995 | Christenson et al. | ........... | 366/59 |
| 5,520,455 A | 5/1996 | Yamada et al. | ................. | 366/97 |
| 5,672,006 A | 9/1997 | Hanada et al. | ................. | 366/84 |
| 5,712,010 A | 1/1998 | Russek et al. | ............... | 428/36.3 |
| 5,782,560 A | 7/1998 | Hatanaka et al. | ............ | 366/298 |
| 5,984,516 A | 11/1999 | Inoue et al. | .................... | 366/85 |
| 6,224,251 B1 | 5/2001 | Kuratsu et al. | ................. | 366/84 |
| 6,481,492 B1 | 11/2002 | Zhu et al. | ................. | 165/109.1 |
| 6,494,607 B2 | 12/2002 | Valsamis et al. | .............. | 366/84 |
| 6,530,422 B2 | 3/2003 | Zhu et al. | ................. | 165/109.1 |
| 6,820,654 B2 | 11/2004 | Lindsay | ....................... | 138/153 |
| 6,902,311 B1 * | 6/2005 | Khouri et al. | ................... | 366/54 |
| 6,918,839 B2 | 7/2005 | Holemans et al. | ........... | 464/181 |
| 2001/0050880 A1 | 12/2001 | Regalia | ........................ | 366/84 |
| 2002/0163852 A1 | 11/2002 | Valsamis et al. | .............. | 366/84 |
| 2004/0089976 A1 | 5/2004 | Bradley et al. | ............... | 264/258 |

(Continued)

FOREIGN PATENT DOCUMENTS

EP        0 262 917        4/1988

(Continued)

*Primary Examiner*—Charles E Cooley
(74) *Attorney, Agent, or Firm*—Thomas R. Kingsbury; James C. Cartiglia

(57) ABSTRACT

An improved rotor design is provided for an internal batch mixing machine. A rotor has a rotor body with an axially extending central cavity, and with a plurality of mixing wings defined on the outer surface of the rotor body. A plurality of internal reinforcing ribs of generally spiral or curved configuration are defined on the rotor body and project into the cavity.

19 Claims, 5 Drawing Sheets

U.S. PATENT DOCUMENTS

| | | | |
|---|---|---|---|
| 2005/0087251 A1 | 4/2005 | Sumitomo | 138/177 |
| 2006/0098527 A1 | 5/2006 | Limper et al. | 366/97 |
| 2006/0104154 A1 | 5/2006 | Inoue et al. | 366/96 |
| 2007/0070802 A1 | 3/2007 | Mortimer et al. | |
| 2007/0291579 A1* | 12/2007 | Huffstetler et al. | 366/147 |

FOREIGN PATENT DOCUMENTS

JP        07303824 A   *  11/1995

* cited by examiner

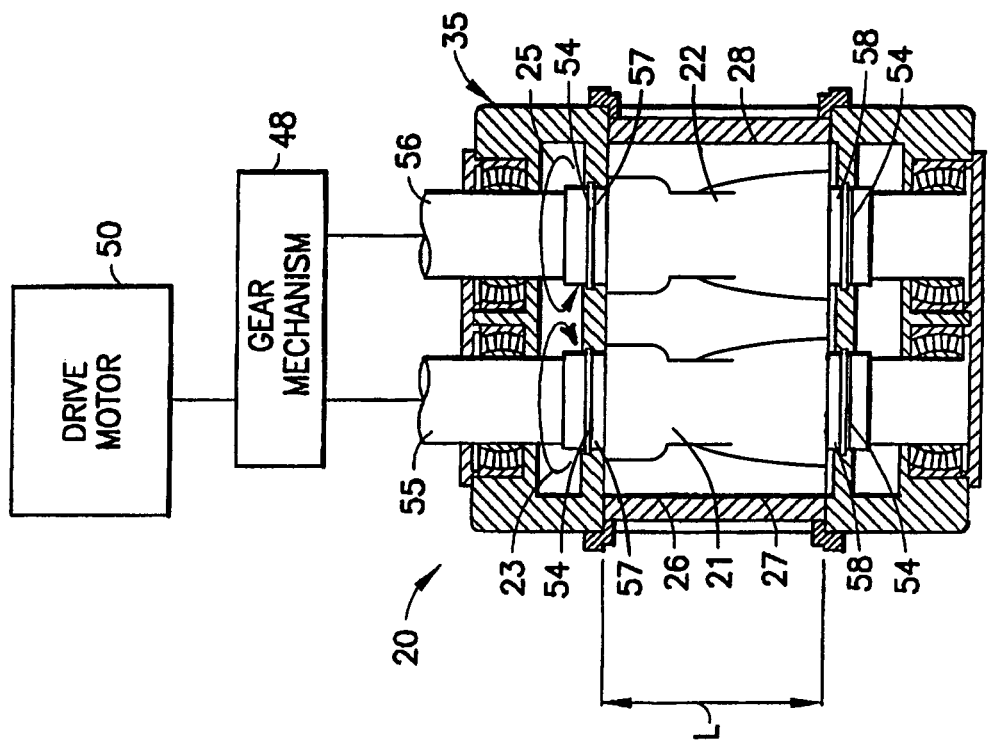
FIG. 1 *(PRIOR ART)*
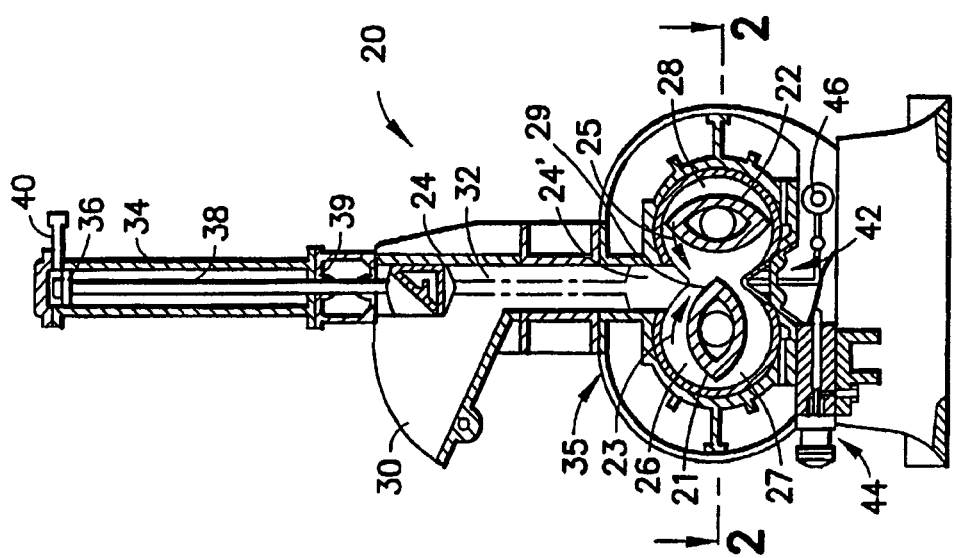
FIG. 2 *(PRIOR ART)*

MIXER ROTOR WITH SPIRAL CORE RIBS

BACKGROUND OF THE INVENTION

1. Field of the Invention

The present invention relates generally to a rotor design for an internal batch mixer, and more particularly to such a rotor having internal reinforcing ribs.

2. Description of the Prior Art

Large internal batch mixers are used in a variety of applications, one being the mixing of rubber products for tire manufacturing. Such mixers include a pair of rotors which rotate counter to each other within a complementary shaped mixing chamber. The rotors are typically hollow and are water cooled.

Typical examples of such prior art batch mixers are shown in U.S. Pat. No. 5,782,560 to Hatanaka et al.; U.S. Pat. No. 6,494,607 to Valsimis et al.; and U.S. Pat. No. 4,834,543 to Nortey.

These rotors are manufactured from large castings and typically have a central axially extending cavity. It has been known within the prior art to provide straight core ribs which protrude into the internal cavity of the rotors and extend in straight lines parallel to the longitudinal axis of the rotor. A typical example of such prior art rotors with straight core ribs is illustrated in FIG. 3. FIG. 3 is a view from the water end of the left rotor of a rotor pair, with the leading edge of one of the wings of the rotor being located at top dead center. The core ribs are located in the corners of the cavity at the water end cross-section, and extend straight into the plane of the drawing of FIG. 3 and continue parallel to the longitudinal axis of the rotor.

A typical failure mode of rotors of the batch mixers of the type just described is a fatigue failure in the areas of highest stress ultimately resulting in a crack extending through the wall of the rotor and allowing water from the water cooled core to leak into the mixing chamber thus contaminating the rubber mixture or other material being mixed in the batch mixer. There is a continuing need for improvements in rotor design that will extend the working life of such rotors prior to failure.

SUMMARY OF THE INVENTION

The present invention provides a rotor for use in an internal batch mixing machine, the rotor including a rotor body having a first end and a second end, and having a central rotational axis and an axial length from the first end to the second end. The rotor body is generally hollow and has an axially extending cavity or core defined within the body. A plurality of mixing wings are defined on an outer surface of the rotor body. A plurality of internal reinforcing ribs of generally spiral or curved configuration are defined on the rotor body and project into the cavity.

In another embodiment of the invention an integrally cast rotor for an internal batch mixing machine has a longitudinal axis of rotation and has an internal longitudinally extending cavity or core. The rotor includes at least two integrally cast internal reinforcing ribs projecting into the cavity and extending longitudinally along paths curved about the longitudinal axis of the rotor.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is an elevation sectioned partly schematic drawing of a typical prior art internal batch mixer.

FIG. 2 is a plan section view taken along line 2-2 of the prior art batch mixer of FIG. 1, showing the left and right rotors in place within the mixing chamber.

FIG. 6 is taken at a point where the leading edge of the long wing is located 20° counterclockwise from top dead center position.

FIG. 7 is taken at a point where the leading edge of the long wing is located 55° counterclockwise from top dead center position.

FIG. 8 is taken at a point where the leading edge of the long wing is located 90° counterclockwise from top dead center position, and is at the general location of the intersection of the short wings and long wings.

FIG. 9 shows the leading edge of the short wings located at an angle of 11° counterclockwise from top dead center.

DETAILED DESCRIPTION OF THE PREFERRED EMBODIMENT

Figure 3:
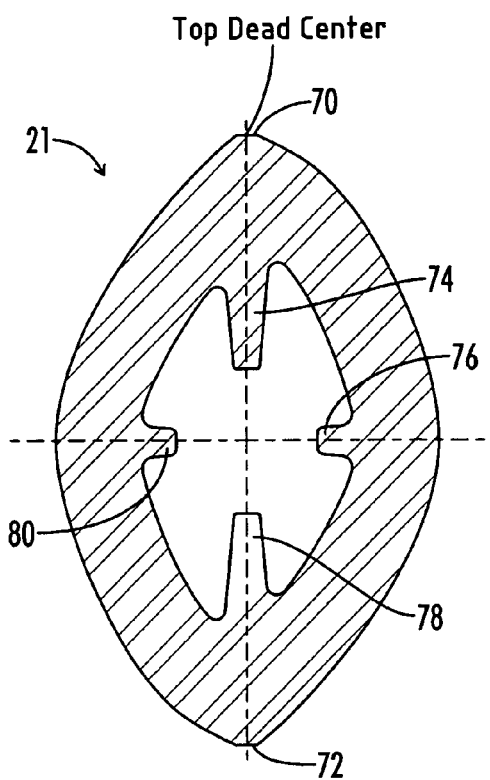
FIG. 3 is a cross-sectional view of a prior art rotor with straight core ribs.

The Prior Art Mixer Of FIGS. 1 and 2

As shown in FIG. 1, a high intensity internal mixing machine, or mixer, of the batch type, generally indicated at 20, includes a pair of non-intermeshing rotors 21 and 22. Mixer 20 includes a vertically reciprocatable ram 24 movable between a raised position shown in FIG. 1 and a lowered operating position 24' shown in dashed outline. This ram 24 is used to move ingredients to be mixed down into a mixing chamber 26. In its operating position 24', it opposes the forces exerted by materials in the mixing chamber 26 as they are being thoroughly and intensely mixed by the wings to be described later on the two counter-rotating rotors 21 and 22, which are turned about spaced parallel horizontal axes, as shown by arrows 23 and 25. The left rotor 21 as seen in FIG. 1, is turned in a clockwise direction about its axis and the right rotor 22 in a counterclockwise direction. The mixing chamber 26 is shaped to accommodate these two rotors and includes left and right chamber cavities 27 and 28 each of generally circular cylindrical shape. These chamber cavities are positioned in horizontally opposed relationship open toward each other. There is a central region 29 of the mixing chamber 26 that is defined as being located generally between the two rotors 21 and 22.

The ingredients to be mixed are initially introduced into a hopper 30, while the ram 24 is raised, so that the ingredients can enter a chute 32 communicating with the hopper 30 and leading down into the central region 29 of the mixing chamber 26. Then the ram is lowered to push the ingredients down into the mixing chamber and to retain them therein. This ram is shown being operated by a fluid-actuated drive cylinder 34, mounted at the top of the overall housing 35 of the mixing machine 20. The fluid cylinder 34, which may be hydraulic or pneumatic, contains a double-acting piston 36 with a piston rod 38 connected to the ram 24 for lowering and raising the ram. The ram is secured to the lower end of the piston rod 38 below the bottom end 39 of the cylinder 34. Actuating fluid under the desired pressure is fed through a supply line 40 into the upper portion of the cylinder 34 for urging the piston 36 downwardly to the lowered operating position 24'. After the mixing operation has been completed, the ram is retracted back up to its raised position by actuating fluid fed into the cylinder 34 below the piston 36 through a supply line not seen in FIG. 1.

The mixed and homogenized materials are discharged from the bottom of the mixing chamber 26 through a discharge opening normally closed by a door 42 which is held in its closed position during mixing operation by a locking mechanism 44. The door 42 when released by the locking mechanism 44 is swung down around a hinge shaft 46. The door is swung, for example, by a pair of hydraulic torque motors, not shown, mounted on opposite ends of the hinge shaft 46.

FIG. 2 is a plan sectional view of the mixing mechanism 20 of FIG. 1 taken along the line 2-2. The rotors 21 and 22 are rotated in opposite directions 23, 25 by a gear mechanism 48 that is driven by a drive motor 50. This gear mechanism 48 comprises identical meshing gears for driving the rotors at the same, namely synchronous, speed. The drive motor 50 may be of conventional configuration and preferably includes speed control means for varying the speed of rotation for the rotors, as desired, depending upon the particular ingredients in the mixing chamber 26 and their temperature and viscous state, and depending upon the desired rate of mixing power to be delivered by the rotors.

There are conventional sealing collars 54 (FIG. 2) located immediately adjacent to each end of each rotor for sealing the mixing chamber 26. The ends of the rotors adjacent to the respective collars 54 are often called the "collar end".

In FIG. 2, the left and right rotors 21 and 22 are shown each having a rotor axial length "L" measured between their respective collar ends 57 and 58. The collar end 57 connected to the drive shaft 55 or 56 is the "driven end" of the rotor, the other collar end 58 being the "coolant end" or "water end".

In a typical application a mixer having a 620 liter volume has a rotor approximately 6 feet long with a rotor diameter of approximately 2 feet. Typical rotor speed is from 30 to 60 rpm. For tire manufacturing a typical "batch" is made up of approximately 1,100 lbs. of rubber mixed with 20 gallons of oil, plus carbon black and pigments. Typically mixing time is 1½ minutes.

Rotor With Spiral Core Ribs

Figure 4:
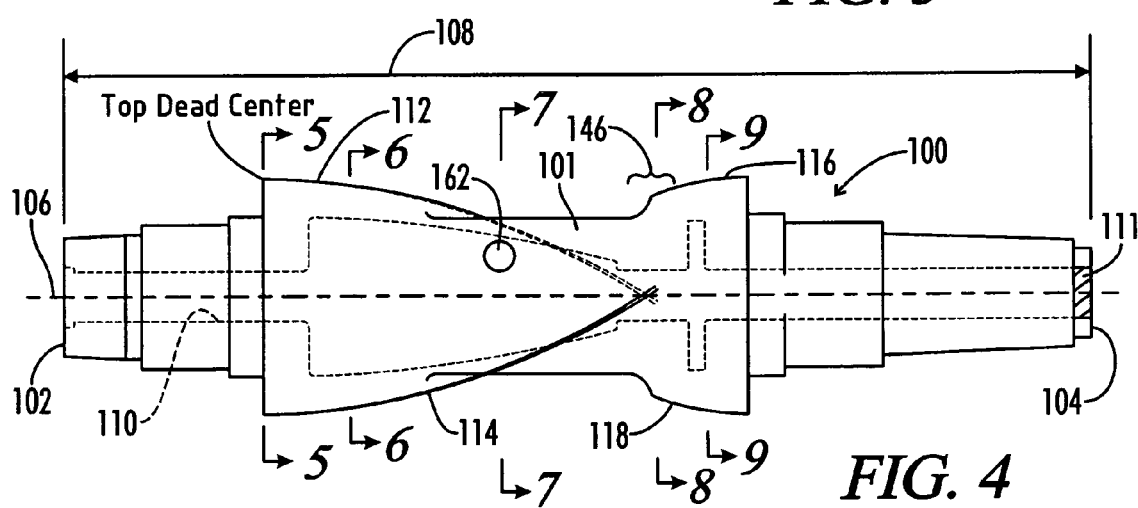
FIG. 4 is a side elevation view of a left rotor having two long wings near its water end and two short wings near its drive end, with the end of the long wings adjacent the water end being located in a top dead center position.
Figure 6:
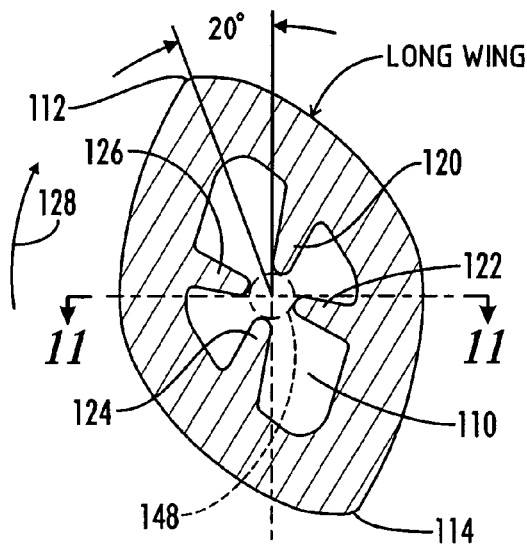
FIGS. 6, 7, 8 and 9 are similar cross-sectional views taken at locations 6-6, 7-7, 8-8 and 9-9 of FIG. 4 illustrating the location of the four spiral core ribs at each of those sections.

FIG. 4 shows a side elevation view of a rotor of the present invention generally designated by the numeral 100. The rotor illustrated is a left hand rotor of a pair of rotors and would, for example, lie in the location of the left hand rotor 21 of the prior art system illustrated in FIG. 2. Rotor 100 comprises a rotor body 101 which is primarily constructed as a large integrally cast steel member having a first end 102 and a second end 104. The first end 102 may be referred to as the water end 102 and the second end 104 may be referred to as the drive end 104.

The rotor body 101 has a central longitudinal axis 106 about which the rotor 100 rotates. Rotor 100 can be described as having an axial length 108 from the first end 102 to the second end 104.

The rotor body 101 is generally hollow and has an axially extending cavity or core 110 defined within the body 101. The core 110 is shown in dashed lines in FIG. 4, and can be seen at various cross-sections in FIGS. 5-9.

The rotor body 101 has defined thereon a plurality of mixing wings which preferably includes first and second long wings 112 and 114 and first and second short wings 116 and 118. The wings are of generally spiral configuration and are integrally cast with a body 101. In FIG. 4 the outer tips of the wings have been tagged with the identifying numerals 112 and 114.

As best seen in the cross-sections of FIGS. 5-8, the two long wings 112 and 114 are located 180° apart, and as they extend from the water end toward the drive end they spiral in a counterclockwise direction about the axis 106 when viewed from the water end 102.

Figure 8:
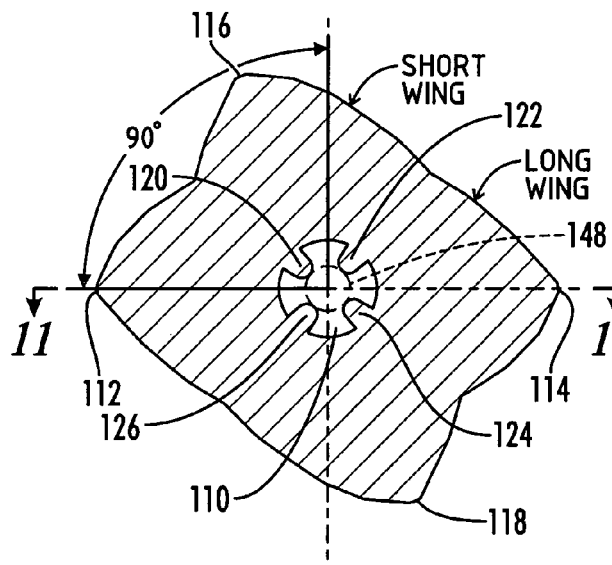
Figure 9:
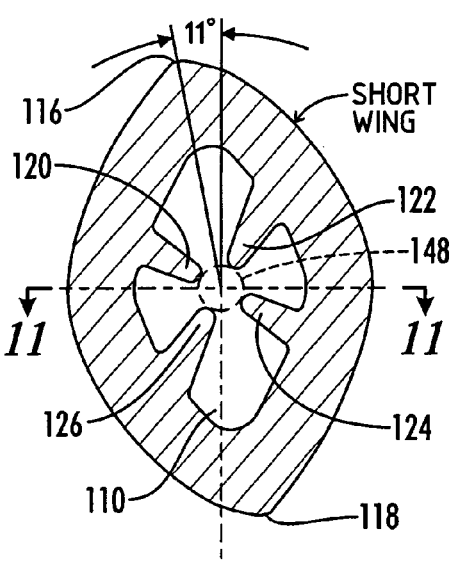

Similarly, as can be seen in viewing FIGS. 8 and 9, the two short wings 116 and 118 are also located 180° apart and spiral in a clockwise direction as one moves from the water end to the drive end of the rotor.

As is best seen in the cross-sectional views of FIGS. 5-9, the rotor 100 includes four internal reinforcing ribs of generally spiral configuration defined on the rotor body 101 and projecting into the cavity 110. The four ribs are numbered 120, 122, 124 and 126, and may be referred to as first, second, third and fourth ribs, respectively. The ribs are integrally cast with body 101.

The cast body 101 typically maintains a wall thickness of 4¼ to 4½ inches along the length of the wings. In one embodiment, each of the spiral ribs has a thickness in the circumferential direction of 1½ to 2 inches as seen in the cross-section views of FIGS. 5-9.

Figure 5:
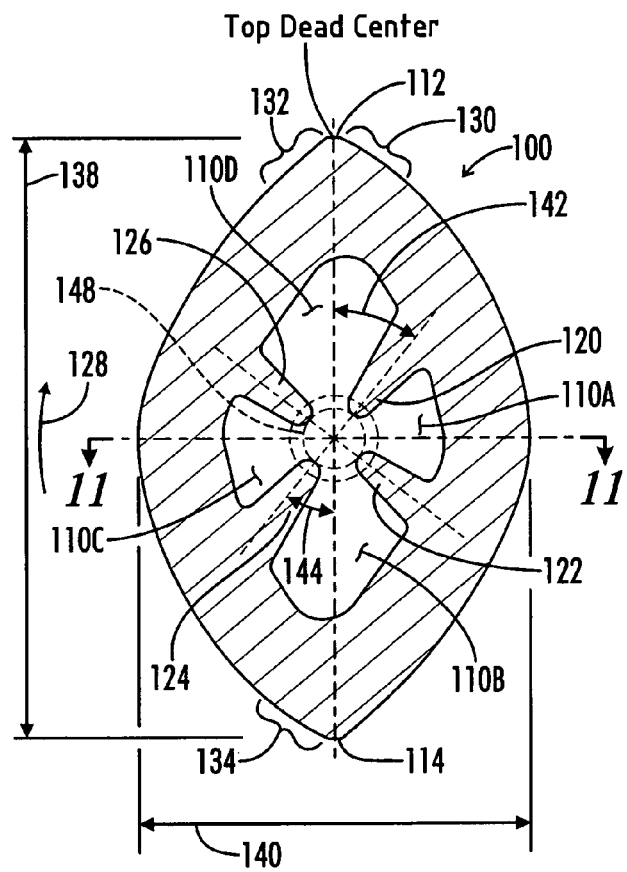
FIG. 5 is a cross-sectional view taken along line 5-5 of FIG. 4 showing the location of four spiral or curved core ribs.

As shown in FIG. 5, the rotor 100 rotates clockwise in the direction indicated by the arrow 128. Thus each of the wings has a leading edge and a trailing edge. For example first long wing 112 has a leading edge portion 130 and a trailing edge portion 132.

With reference to FIG. 5, the first and second long wings 112 and 114 can be described as first and second diametrically opposed wings 112 and 114 having first and second leading edge portions 130 and 134, respectively, substantially 180° apart, thus forming an eccentric lobe shaped cross-section having a longer diameter 138 and a shorter diameter 140.

In the embodiment illustrated, each of the reinforcing ribs 120, 122, 124 and 126 is located mid-span between the longer and shorter diameters.

As illustrated, the shown preferred embodiment of rotor 100 includes four reinforcing ribs located substantially 90° apart.

It is possible to have less than four ribs or more than four ribs. For example, the rotor 100 could be built with only the two diametrically opposed reinforcing ribs 120 and 124. If there is only one reinforcing rib per wing such as in the alternative just described, it is preferable that the first reinforcing rib 120 lead the leading edge portion 130 of first wing 112 by an acute angle 142 in the range of from about 30° to about 50°. (See FIG. 5) The rib 124 associated with second wing 114 preferably leads the leading edge portion 134 of second wing 114 by a second acute angle 144 which is also preferably in the range of from about 30° to about 50°. In the embodiment illustrated the angles 142 and 144 are shown as being 39°.

When four ribs are used as shown in FIGS. 5-9, the second pair of reinforcing ribs 126 and 122 preferably trail the leading edge of the wings by a similar acute angle.

The spiral configuration of the core ribs 120, 122, 124 and 126 may be described as corresponding to or generally paralleling the spiral configuration of the wings themselves, although it will be understood that they need not be exactly parallel.

As is apparent from FIGS. 4-9, the two longer wings 112 and 114 which are located nearer the water end 102 and the two shorter wings 116 and 118 which are located near the drive end 104 spiral in opposite directions and intersect in the area 146 which may be generally referred to as a lobe transfer area 146. The cross-section 8-8 shown in FIG. 8 is located generally along the central plane of this lobe transfer area 146.

Figure 11:
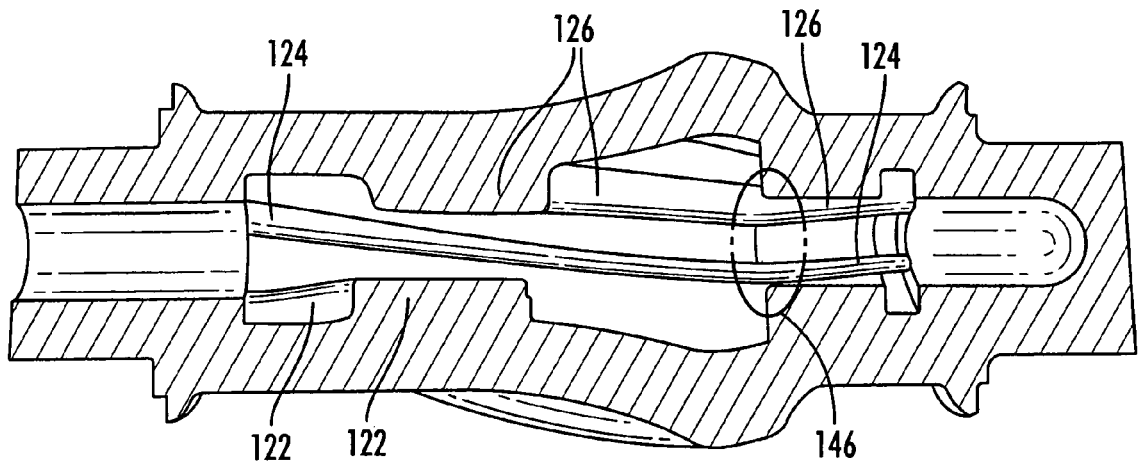
FIG. 11 is an axial sectioned view of the rotor of FIG. 4 showing the spiral layout of the core ribs, and illustrating the manner in which the core ribs reverse direction of curvature at the point of intersection of the long wings and short wings.

The reinforcing ribs 120, 122, 124 and 126 are continuous across the lobe transfer area, but since they generally follow the mid span of the wings, and since the short wings spiral in opposite directions from the long wings, there is a discontinuity or change of direction of curvature of the ribs as they pass across the lobe transfer area 146. This can be determined by following the location of the ribs in FIGS. 6, 7, 8 and 9, with FIG. 8 being the location of the discontinuity. It can also best be seen in FIG. 11 where a complete length of one of the ribs 120 is visible and the location of the transition zone 146 with the discontinuity or change of curvature is circled and identified as 146.

Depending upon the internal configuration of the inner cavity 110, the spiral core ribs 120, 122, 124 and 126 need not extend the entire length of the wings, although they will extend over a substantial majority of the length of the wings.

The far end or drive end of the central cavity 110 is typically closed by a weld plug 111.

Figure 10:
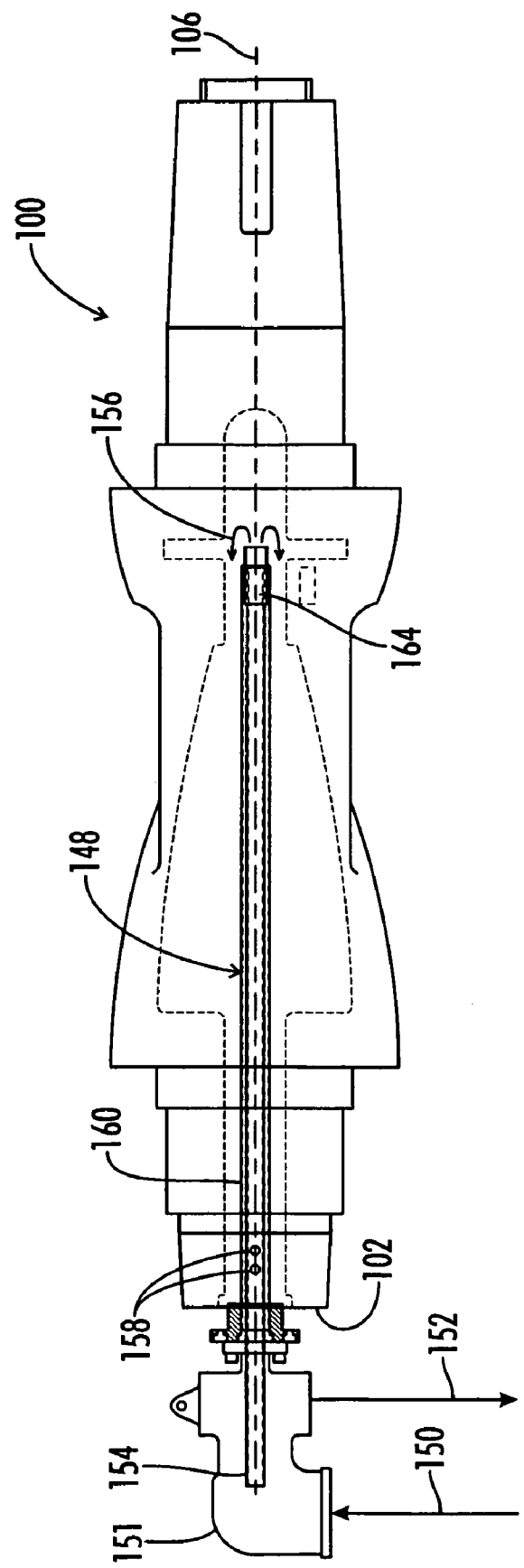
FIG. 10 is a cross-sectional view of the rotor of FIG. 4 showing the placement of the siphon tube and related plumbing connections.

As shown in FIG. 10, an axial siphon tube 148 may be located along the axis 106 of rotor 100. Each of the reinforcing ribs 120, 122, 124 and 126 extends radially inward into engagement with the outer cylindrical surface of the siphon tube 148. The location of the siphon tube 148 is shown in dashed lines in FIGS. 5-9.

The axial siphon tube 148 may for example be made up of a 3 inch nominal diameter outer tube 160 and a 1½ inch nominal diameter inner tube 154. A spacer 164 made of a polymeric material, and preferably an ultra high molecular weight polymeric material, is received about the inner tube 154 adjacent the right hand end thereof in FIG. 10 and seals the annulus between the inner tube 154 and outer tube 160 at that end.

Adjacent the water end 102 of rotor 100 in FIG. 10 there are schematically illustrated various plumbing headers which communicate water to the rotor 100. Water enters at a water inlet 150 and exits at a water outlet or water return 152.

The water from inlet 150 flows through an axially innermost concentric pipe 154 of siphon tube 148 flowing out the right hand end thereof and then reversing as indicated by arrows 156.

In viewing the cross-sectional views of FIGS. 5-9, it is apparent that due to the engagement of the innermost ends of ribs 120, 122, 124 and 126 with the outer surface of siphon tube 148, the core or cavity 110 of rotor 100 is divided into four separate water return cavity segments which may be defined as 110A, 110B, 110C and 110D.

The water flows back from right to left through these water return cavity segments 110A, 110B, 110C and 110D then flows radially inward through return holes such as 158 into an annulus between the innermost tube 154 and an outer tube 160, which annulus returns the water to water return or outlet line 152.

The purpose of the circulating water is to cool the rotor and in turn cool the rubber mixture being mixed so that the mixer can operate as long as possible without overheating the rubber. It is believed that the presence of core ribs also improves this cooling function.

It will be appreciated that there is a rotary union (not shown) between the rotor 100 and the header 151. The siphon tube 148 is fixed to and rotates with the rotor 100. The header 151 does not rotate.

Figure 7:
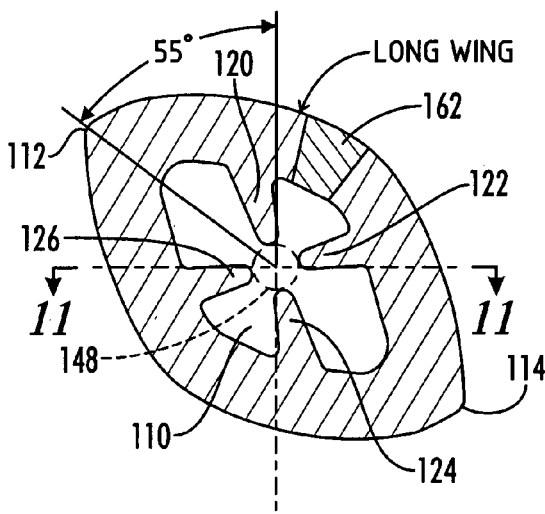

As will be appreciated by those skilled in the art, the rotor body 101 which is a large integrally cast steel member, will typically have a hole in the initial casting which is plugged with a circular piece of metal which is welded in place and is generally referred to as a casting plug 162, a typical location of which is shown for example in FIGS. 4 and 7 and designated by the numeral 162. Preferably the reinforcing ribs 122, 124, 126 and 128 are located so as to avoid passing across the casting plug 162.

At this point it is helpful to contrast the location and shape of the spiral core ribs 120, 122, 124 and 126 with the straight core ribs of the prior art illustrated in FIG. 3. FIG. 3 is a view of a typical prior art rotor with straight core ribs taken at the same general cross-sectional location as is FIG. 5. Thus the prior art rotor of FIG. 3 which is generally designated by the numeral 21 had two longer wings 70 and 72 and had four straight core ribs 74, 76, 78 and 80. At the water end location with the rotor 21 located with first wing 70 at top dead center position as shown in FIG. 3, the straight core ribs 74 and 78 were diametrically opposed and each located directly under the tip of one of the long wings, with the other two ribs 76 and 80 being located at approximately 90° thereto. The spiral core ribs of the present invention, in contrast, are not located under the tips of the wings, but instead are located mid-span on the wings. It is believed that by avoiding placement of the core ribs in the corners of the cavity directly below the wing tips in FIG. 4, better cooling is provided near the tip which is where the majority of the work is done. And of course the spiral ribs spiral around the axis 106, whereas the prior art straight ribs paralleled the axis. With the prior art straight core ribs a minimal wall thickness of for example 4½ inches was maintained for the rotor so the vertical height of the rib varies along its length. In the past the siphon tubes utilized with rotors like that of FIG. 3 were simply 1½ diameter pipe that did not engage the straight core ribs. Return flow was merely a flooded flow along approximately the bottom half of the rotor cavity.

The straight core ribs of FIG. 3 have relatively square, sharp edges on their outer tips. Each of the ribs 74, 76, 78 and 80 extend straight into the plane of the paper parallel to the length of the rotor and they do not spiral about the longitudinal axis of the rotor. The preferred tip shape of the spiral core ribs 120, 122, 124 and 126, in contrast, have much more rounded outer tips, they are not located directly beneath the wings, and they have rounded corners at their roots.

The use of the spiral core ribs constructed generally as described above provides a surprisingly reduced concentration of stresses in the rotor 100, particularly in the areas of highest stress concentration such as lobe transfer area 146, with a correspondingly surprising increase in life expectancy of the rotor.

This has been shown by finite element analysis comparing both spiral core ribs and straight core ribs to no core ribs, which has shown a decrease in stress for the spiral core ribs as compared to no core ribs of 32.5%, as contrasted to only a 19.1% decrease in stress of straight core ribs as contrasted to no core ribs. This is shown on the following Table 1.

TABLE 1

| Rotor With | Maximum Stress (in psi) | % Decrease in Stress (with reference to no core ribs) |
| --- | --- | --- |
| Spiral Core Ribs | 8,945 | 32.5 |
| Straight Core Ribs | 10,716 | 19.1 |
| No Core Ribs | 13,247 | NA |

Figure 12:
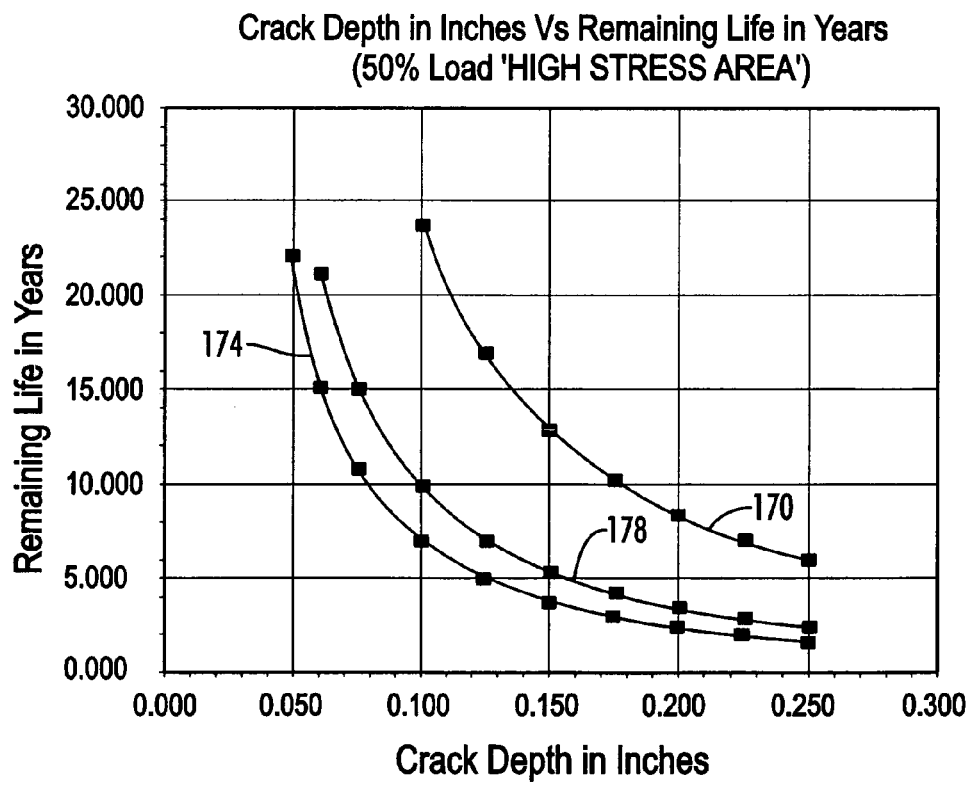
FIG. 12 is a graphical representation of remaining life in years for a given detected crack size for rotors with spiral core ribs as compared to prior art rotors with straight core ribs or no core ribs.

FIG. 12 is a graphical representation of the projected remaining life in years for detected crack depths in the high stress areas of the rotor as calculated through finite element analysis. The rightmost curve 170 shows the remaining life for a rotor with spiral core ribs. The middle curve 178 shows the expected life for a rotor with straight core ribs. The left hand curve 174 shows the expected life for a rotor with no core ribs.

The crack size shown on the horizontal axis corresponds to crack sizes which would be located during non-destructive testing of a rotor to determine whether the rotor could be put back in service or rebuilt.

Due to the significantly reduced internal stresses within the rotor with spiral core ribs, a rotor with a given detected crack size has a significantly greater remaining life if the rotor has spiral core ribs than if it has either straight core ribs or no core ribs.

The calculations resulting in the curves of FIG. 12 were done for a 50% power load, that is with one half the motor power going to each rotor, and for a safety factor of 1.0. The 50% load is typically approximately 2,000 horsepower per rotor.

The presence of the spiral core ribs strengthens the rotor thus reducing the stresses therein. The location of the spiral core ribs leading the leading edge of the wings is believed to optimize this effect since the leading edge area of the wings encounter the highest stresses when engaging the material being mixed.

Given the data of FIG. 12, a typical rotor with no ribs has a projected life when new of approximately 15 years, whereas a rotor with spiral core ribs has a projected life when new of approximately 45 years. This converts to very substantial savings in maintenance and down time.

For example, the labor costs to swap out a mixer is approximately $125,000. The cost for a set of two new rotors is $140,000. A mixer is typically down for a week to be replaced, and in a typical plant one week's production of a mixer is worth approximately $1,000,000.

With current technology utilizing no core ribs a set of rotors will typically be rebuilt one time at a cost of $90,000 as compared to $180,000 to purchase a new set of rotors. It is believed that with the reduced stresses provided by spiral core ribs it will be possible to do two rebuilds on a rotor thus saving an additional $90,000 as compared to the cost of purchasing a new set of rotors.

Also, through the use of spiral core mixers the unexpected catastrophic failures which lead to plant shutdown will be reduced.

Accordingly, it is an advantage of the present invention to provide an improved rotor design for an internal batch mixing machine.

Another advantage of the present invention is the provision of a rotor design having decreased stresses and thus increased life, being more resistant to the growth of fatigue induced cracks in the casting of the rotor.

Still another advantage of the present invention is the provision of a rotor design having spiral or curved core ribs.

Still another advantage of the present invention is the provision of a rotor design having an axial siphon tube engaged by a plurality of inwardly extending core ribs thus providing a plurality of separate water return cavity segments.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. A rotor for use in an internal batch mixing machine, comprising:
   a rotor body having a first and a second end, and having a central rotational axis and an axial length from the first end to the second end, the rotor body being generally hollow and having an axially extending cavity defined within the body;
   a plurality of mixing wings defined on an outer surface of the rotor body; and
   a plurality of internal reinforcing ribs of generally spiral configuration defined on said rotor body and projecting into said cavity.

2. The rotor of claim 1, wherein:
   the mixing wings are of generally spiral configuration; and
   the generally spiral configuration of the reinforcing ribs corresponds to the generally spiral configuration of the mixing wings.

3. The rotor of claim 2, wherein:
   the rotor has a direction of rotation;
   the mixing wings each have a leading edge; and
   the plurality of internal reinforcing ribs includes at least one reinforcing rib leading each leading edge by an acute angle.

4. The rotor of claim 3, wherein:
   the plurality of internal reinforcing ribs further includes at least one reinforcing rib trailing each leading edge by a second acute angle.

5. The rotor of claim 2, wherein:
   the plurality of mixing wings includes two longer wings located nearer to one of said first and second ends, and two shorter wings located nearer to the other of said first and second ends, the longer wings spiraling in an opposite direction than the shorter wings, and the longer wings intersecting the shorter wings in a lobe transfer area; and
   the reinforcing ribs are continuous across the lobe transfer area and have a discontinuity of direction across the lobe transfer area.

6. The rotor of claim 2, wherein:
   the plurality of wings includes first and second diametrically opposed wings having first and second leading edges respectively, substantially 180° apart, thus forming an eccentric cross-section having a longer diameter and a shorter diameter; and
   each of the reinforcing ribs is located mid-span between said longer diameter and said shorter diameter.

7. The rotor of claim 6, wherein:
the plurality of reinforcing ribs includes four reinforcing ribs located substantially 90° apart.

8. The rotor of claim 1, wherein:
the rotor body has a casting plug located therein; and
the reinforcing ribs are located so as to avoid passing across the casting plug.

9. The rotor of claim 1, further comprising:
an axial siphon tube located along the axis of the rotor and connected to the rotor for rotation with the rotor; and
wherein each of the reinforcing ribs extends radially inward into engagement with the siphon tube thereby dividing the cavity of the rotor body into a plurality of separate water return cavity segments.

10. The rotor of claim 9, wherein:
the plurality of reinforcing ribs includes four reinforcing ribs, and the cavity of the rotor body is divided into four separate water return cavity segments.

11. A rotor for an internal batch mixing machine, comprising:
an integrally cast rotor body having a longitudinal axis of rotation and having an internal longitudinally extending cavity, the rotor body including at least two integrally cast internal reinforcing ribs projecting into the cavity and extending longitudinally along paths curved along the longitudinal axis of the rotor body;
the rotor body further including at least two integrally cast external wings having leading edges curving about the longitudinal axis of the rotor; and
wherein the curved path of the internal reinforcing ribs generally parallels the curving leading edges of the external wings.

12. The rotor of claim 11, wherein the at least two reinforcing ribs lead the leading edges of the external wings by an acute angle.

13. The rotor of claim 12, wherein the acute angle is in the range of from about 30° to about 50°.

14. The rotor of claim 12, further comprising two additional reinforcing ribs trailing the leading edges of the external wings by a second acute angle.

15. The rotor of claim 11, wherein:
the at least two integrally cast external wings includes two longer wings located nearer one end of the rotor and two shorter wings located nearer the other end of the rotor, the longer wings curving in an opposite direction from the shorter wings and intersecting the shorter wings in a lobe transfer area; and
the reinforcing ribs are continuous across the lobe transfer area and reverse direction of curvature as they cross the lobe transfer area.

16. The rotor of claim 11, wherein:
the at least two wings includes first and second diametrically opposed wings having first and second leading edges respectively, substantially 180° apart, thus forming an eccentric cross-section having a longer diameter and a shorter diameter; and
each of the reinforcing ribs is located mid-span between said longer diameter and said shorter diameter.

17. The rotor of claim 16, wherein:
the at least two reinforcing ribs includes four reinforcing ribs located substantially 90° apart.

18. The rotor of claim 11, wherein:
the rotor body has a casting plug located therein; and
the reinforcing ribs are located so as to avoid passing across the casting plug.

19. A rotor for an internal batch mixing machine, comprising:
an internally cast rotor body having a longitudinal axis of rotation and having an internal longitudinally extending cavity, the rotor body including at least two integrally cast internal reinforcing ribs projecting into the cavity and extending longitudinally along paths curved along the longitudinal axis of the rotor body;
an axial siphon tube located along the axis of the rotor body and connected to the rotor body for rotation with the rotor body; and
wherein each of the reinforcing ribs extends radially inward into engagement with the siphon tube thereby dividing the cavity of the rotor body into a plurality of separate water return cavity segment.

* * * * *